United States Patent
Bollinger

[15] 3,679,858
[45] July 25, 1972

[54] METHOD FORMING CLAD PLATES FROM CURVED SURFACES

[72] Inventor: William C. Bollinger, Troy, Mich.
[73] Assignee: Detroit Flame Hardening Co., Detroit, Mich.
[22] Filed: March 17, 1971
[21] Appl. No.: 125,202

[52] U.S. Cl..................................219/76, 117/131, 118/44, 219/137
[51] Int. Cl........................................................B23k 9/04
[58] Field of Search..................219/137, 76; 117/8, 66, 131; 29/527.2; 118/44; 72/47

[56] References Cited

UNITED STATES PATENTS

| 3,513,288 | 5/1970 | Arnoldy | 219/76 |
| 2,828,406 | 3/1958 | Kinkead | 219/76 |
| 2,755,199 | 7/1956 | Rossheim et al. | 219/76 |
| 2,191,472 | 2/1940 | Hopkins et al. | 219/76 |
| 1,896,411 | 2/1933 | Maskrey | 219/76 |

Primary Examiner—J. V. Truhe
Assistant Examiner—George A. Montanye
Attorney—Harness, Dickey & Pierce

[57] ABSTRACT

A plate having a special surface layer is made by shaping to a desired configuration a longitudinal section cut from a tube that has been surfaced by a suitable continuous welding deposition process, preferably a bulk welding process.

9 Claims, 8 Drawing Figures

PATENTED JUL 25 1972 3,679,858
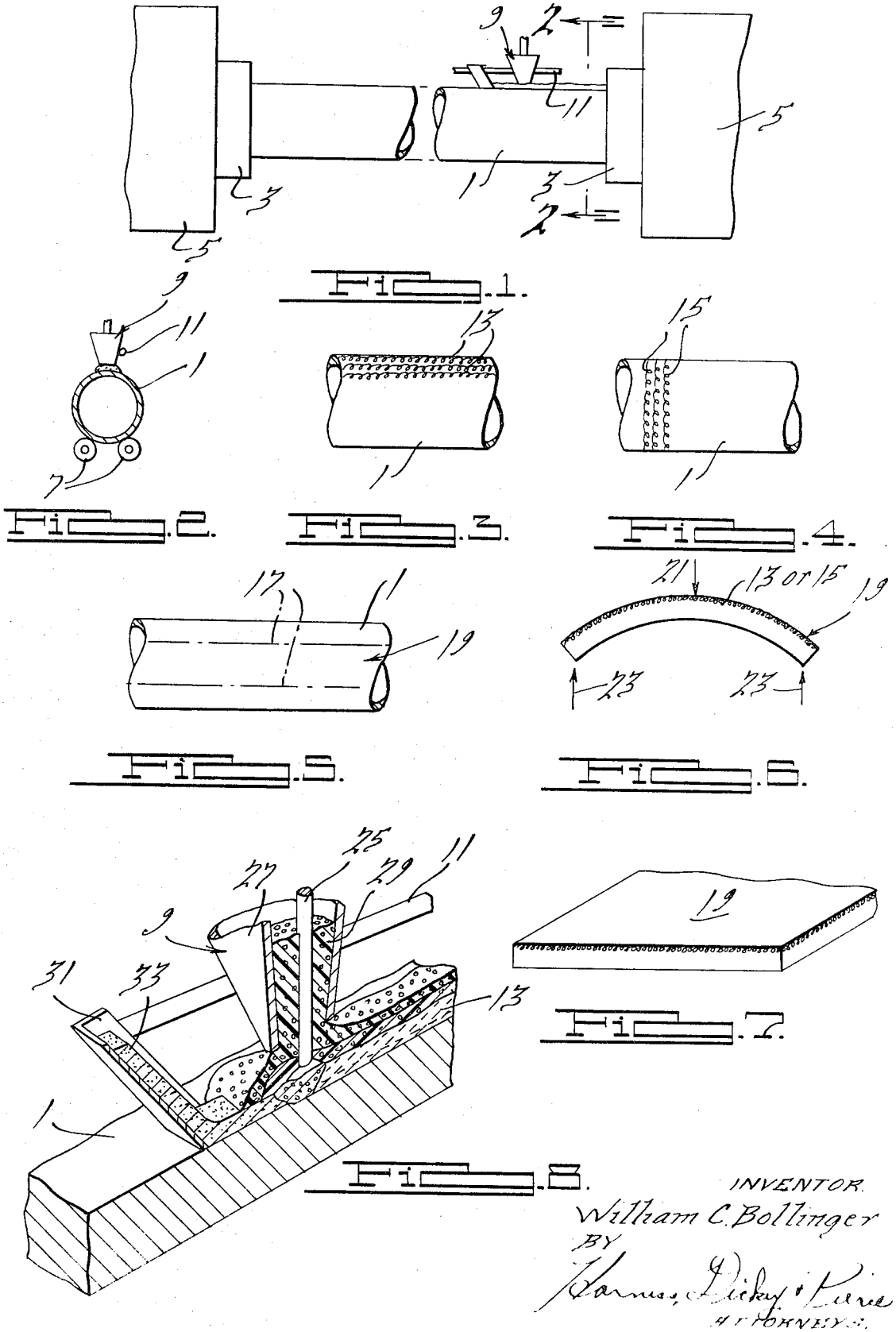

3,679,858

METHOD FORMING CLAD PLATES FROM CURVED SURFACES

BACKGROUND OF THE INVENTION

For many years the usual way to make flat plates having a protective coating, such as a surface layer of hard, abrasion, temperature, or corrosion resisting material, has been to clamp a flat plate to a flat surface and deposit by welding the appropriate material on the uppermost surface of the plate. This method has not been satisfactory since the welding process caused excessive distortion of the plate in an upwardly concave direction and subsequent straightening often caused the welded layer to crack or peel off.

BRIEF SUMMARY OF THE INVENTION

It is the purpose of this invention to provide a method of hard surfacing plate, which includes surfacing with either a wear, temperature, or corrosion resisting material, that avoids the problems associated with previous methods wherein the deposited layer tends to crack and/or peel off. The invention accomplishes this purpose by depositing the weld material on the plate surface when the plate is in a different shape than the shape that is finally desired. The shape at the time of deposition is selected so that the weld layer is placed in compression in the process of straightening or flattening the plate from the weld condition to the desired final shape. In a preferred form, the process comprises the deposition by welding of the desired material onto the outside of a tube of the desired base metal. After cooling, the tube is longitudinally sectioned and the sections are straightened to place the weld layer which is on the outside of the tube in compression and thereby eliminate tension failures such as cracking and peeling.

DESCRIPTION OF THE DRAWINGS

FIG. 1 is a diagrammatic side elevation of a tube being treated in accordance with the invention;

FIG. 2 is a diagrammatic end elevation of another method of rotating the tube during the process;

FIG. 3 is a side elevation of a portion of a tube in which the weld material has been deposited along longitudinal lines;

FIG. 4 is a side elevation of a portion of a tube in which the weld has been deposited along circular lines;

FIG. 5 is a side elevation illustrating how the tube of any of the preceding figures may be sectioned in accordance with the invention;

FIG. 6 is a cross section of the section which has been removed from the tube of FIG. 5 and illustrates the application of forces to flatten the section or otherwise shape it to the desired configuration;

FIG. 7 is a perspective view showing the section of FIG. 6 after it has been straightened to a flat condition; and FIG. 8 is a perspective sectional view of the bulkwelding equipment.

DESCRIPTION OF THE INVENTION

In FIG. 1 a metal tube 1, ordinarily of low carbon steel, is supported at opposite ends in chucks 3 of a lathe 5 so that the tube may be indexed or rotated at a desired rate. FIG. 2 illustrates another method of rotating the tube 1 which leaves the ends free and accessible for treatment in accordance with this invention and wherein rollers 7 support and rotate the tube in the desired direction. The tube 1 may be of any desired length, wall thickness, and diameter, from small to extremely large. These dimensions are selected in accordance with the depth of layer and the size of ultimate plate that is desired.

Bulk welding equipment 9, which is available on the open market, is supported by suitable means such as a longitudinal support rod 11, in operative relationship with the outside surface of the tube 1 so that when activated it fuses a layer on and in the outside surface of the tube 1 consisting of the desired depth of a desired material. The bulk welder 9 will deposit weld material along a band or strip on the outer surface on the tube 1. As indicated in FIG. 3, the weld bands 13 may be longitudinal in which case the welder 9 is caused to move lengthwise of the tube 1 along the rod 11 while it is performing a welding operation. The lathe 5 or the mechanism 7 is then activated to index the tube the correct angular increment so that the welder 9 may then run the length of the tube to deposit another weld strip 13 adjacent to the previous weld 13.

Instead of longitudinal welds 13, the welds may be in circular form 15 as illustrated in FIG. 4. In this case the mechanism 5 or 7 is actuated during the operation of the welder to rotate the tube 1 through 3602 whereupon the welder 9 is indexed along the support 11 to deposit the next weld 15 adjacent to the previous weld. If desired, the weld may be of spiral or helical form by combining the motions of FIGS. 3 and 4.

After all or a selected portion of the outer surface of the tube 1 has been covered with weld material to the desired depth, the tube 1 is cooled and removed from the mechanism 5 for sectioning. It may be removed from mechanism 7 or allowed to remain on it during sectioning. The sectioning operation consists in cutting the tube along lines such as indicated at 17 in FIG. 5 by suitable means such as mechanical sawing, flame cutting, use of a plasma cutting torch, etc. The spacing of the lines 17 is determined by the desired width of the plate to be ultimately obtained. After sectioning, the part 19 that is removed has a cross section which is convex as appears in FIG. 6 so that the weld layer 13 or 15 is on the convex side. This is then straightened to the desired shape by changing the curvature of the section 19 in a direction to increase its curvature, this normally being to the point where the section 19 is flat. The straightening may be done by suitable methods and apparatus known in the art and is illustrated by the application of a straightening force 21 applied to the weld layer side and opposite reaction forces 23 located outwardly of the straightening force 21. The straightening process shapes the section 19 to the desired curvature, such as the flat shape illustrated in FIG. 7. It will be observed that the straightening operation causes the convex side, that is, the weld layer side, to be placed in compression and the concave, low carbon, ductile side to be placed in tension. Thus, the tensile forces which heretofore have caused cracking or peeling of the weld layer are avoided and forces of an opposite nature, i.e., compressive forces are present in the deposited surface layer during the straightening operation. The bulk welding fusing operation blends the surface layer and the base metal together without leaving a plane of weakness between them that is susceptible to failure during straightening.

The bulk welding equipment 9 schematically illustrated in FIG. 8 is well known to the trade and is a consumable electrode arc welding device in which most of the electrical energy is used to melt a granular metal composition that is deposited upon and fused into the base material presented by tube 1. The process is rapid and economical and has a controllable penetration, produces minimum distortion and internal stress, and gives an unusually fine grain structure. The process is conducted so that the weld beads or strips 13 or 15 extend into the outer surface of the tube to a depth of preferably one-eighth to three-eights inch and are preferably as wide as is consistent with good results, such width being approximately 1½ inches. Various granular materials may be used depending upon the specific properties desired in the surface of plate 19. Ordinarily, special alloys such as stainless steel, tungsten carbide, high speed steel, "Hastelloy," "Stellite," or the diamond substitutes will be used to obtain any one or combination of temperature resisting, corrosion resisting, or wear and abrasion resisting properties, the surface layer such alloys produce being embraced by the term "hard surface" as used herein.

In the bulk welding equipment 9, a mild steel wire electrode 25 extends through a hopper 27 of flux 29 into contact with the trailing edge of a hopper 31 of the special granular alloy 33. The alloy 33 is supplied at a measured and controlled rate as the equipment 9 moves relative to the surface of the tube 1. The electrode 25 and the tube 1 are connected in a closed electrical circuit so that electrical energy must flow through the granular alloy material and in doing so melts it to form a molten puddle or band along the tube surface which upon solidifying becomes the bead 13 or 15. Suitable control circuitry (not illustrated) is used to control and synchronize the operation and movements of the equipment 9 and the tube 1.

Thus, the invention provides a method for producing hard surfaced plate which, in its broad aspects, includes the deposition of a special alloy coating upon a surface which is shaped so that upon subsequent straightening to the desired final shape the coating is placed in compression. More specifically, for most applications the alloy is deposited upon the outer surface of a tube which is cooled and thereafter longitudinally sectioned and the convexity of the deposited layer reduced (i.e., the part is flattened to a desired degree) to reach the desired final configuration. It is a particular advantage of the invention that the sectioning and straightening may be done when the tube 1 is at room temperature but it is apparent that either of these operations may be performed when the tube is at an elevated temperature.

I claim:

1. A method of hard surfacing which comprises fusing by a high temperature weld process a coating of hard surfacing alloy on the convex side of a curved metal part and thereafter flattening the part to reduce the convexity of the convex side.

2. A method as set forth in claim 1 including the step of cooling the part to room temperature and flattening it while at room temperature.

3. The method of hard surfacing plate which comprises fusing by a high temperature weld process a coating of a hard surfacing alloy on the outside of a tube, longitudinally sectioning the tube, and flattening a section removed from the tube.

4. A method as set forth in claim 3 including the step of cooling the tube after welding and flattening the section while it is cool.

5. A method as set forth in claim 4 wherein the weld process is bulk welding.

6. A method as set forth in claim 3 wherein the tube is rotated about its axis during welding.

7. A method as set forth in claim 3 wherein the weld process deposits longitudinal weld bands on the tube to cover the outer surface of the tube.

8. A method as set forth in claim 3 wherein the weld process deposits circular weld bands on the tube to cover the outer surface of the tube.

9. The method of making flat plate having a protective coating on one face which comprises fusing at a high temperature a protective alloy coating on the outside periphery of a metal tube, cooling the tube to substantially room temperature, longitudinally sectioning the tube to form tube segments, and applying straightening pressure to the segments to flatten them into planar plate having a protective coating on one side.

* * * * *